United States Patent
Huang (10) Patent No.: US 12,080,498 B2
(45) Date of Patent: Sep. 3, 2024

(54) RELAY, BATTERY DISTRIBUTION BOX AND BATTERY PACK

(71) Applicant: CALB Co., Ltd., Jiangsu (CN)

(72) Inventor: Linghang Huang, Xiamen (CN)

(73) Assignee: CALB Co., Ltd., Jiangsu (CN)

( * ) Notice: Subject to any disclaimer, the term of this patent is extended or adjusted under 35 U.S.C. 154(b) by 173 days.

(21) Appl. No.: 17/827,775

(22) Filed: May 29, 2022

(65) Prior Publication Data

US 2023/0298838 A1  Sep. 21, 2023

(30) Foreign Application Priority Data

Mar. 17, 2022 (CN) .......................... 202210263968.8

(51) Int. Cl.
| | | |
|---|---|---|
| H01H 45/04 | (2006.01) | |
| H01H 45/02 | (2006.01) | |
| H01H 50/04 | (2006.01) | |
| H01H 50/18 | (2006.01) | |
| H01H 50/36 | (2006.01) | |
| H01H 50/44 | (2006.01) | |

(Continued)

(52) U.S. Cl.
CPC ............ *H01H 50/18* (2013.01); *H01H 45/02* (2013.01); *H01H 50/04* (2013.01); *H01H 50/36* (2013.01); *H01H 50/443* (2013.01); *H01H 71/02* (2013.01); *H01M 50/204* (2021.01); *H01M 2200/00* (2013.01)

(58) Field of Classification Search
CPC ........ H01H 50/18; H01H 50/04; H01H 50/36; H01H 50/443; H01H 50/047; H01H 50/305; H01H 50/30; H01H 50/041; H01H 45/02; H01H 71/02; H01M 50/204; H01M 2200/00; H01M 10/425
USPC .................................................. 200/293, 288
See application file for complete search history.

(56) References Cited

U.S. PATENT DOCUMENTS 5,157,367 A * 10/1992 Itoh ...................... H01H 50/443
                                                         335/131
6,236,575 B1 * 5/2001 Ritter ................... H01H 50/305
                                                         439/271

(Continued)

FOREIGN PATENT DOCUMENTS

| CN | 106206165 | 12/2016 |
|---|---|---|
| JP | H06196070 | 7/1994 |

(Continued)

OTHER PUBLICATIONS

"Search Report of Europe Counterpart Application", issued on Nov. 21, 2022, p. 1-p. 8.

*Primary Examiner* — William A Bolton
(74) *Attorney, Agent, or Firm* — JCIP GLOBAL INC.

(57) ABSTRACT

The disclosure relates to a relay, a battery distribution box and a battery pack. The relay includes a relay body and a buffer assembly. The relay body includes a housing and a stationary contact, a movable contact and a coil assembly located inside the housing. The coil assembly is abler to drive the movable contact to move toward or away from the stationary contact to make the movable contact to contact or disconnect from the stationary contact. The housing is fixed through the base, the buffer assembly is mounted on the base, and/or is mounted on the outside of the housing, and configured to buffer the force generated by the action of the movable contact.

20 Claims, 10 Drawing Sheets

(51) Int. Cl.
*H01H 71/02* (2006.01)
*H01M 50/204* (2021.01)

(56) References Cited

U.S. PATENT DOCUMENTS

| | | | |
|---|---|---|---|
| 7,417,521 B2* | 8/2008 | Marukawa | H01H 50/305 |
| | | | 180/68.5 |
| 8,653,922 B2 | 2/2014 | Flaceau | |
| 10,825,631 B2* | 11/2020 | Priest | H01H 50/163 |
| 2005/0057332 A1* | 3/2005 | Nakamura | H01H 50/042 |
| | | | 335/78 |
| 2008/0068116 A1 | 3/2008 | Marukawa et al. | |
| 2013/0082806 A1* | 4/2013 | Moriyama | H01H 50/02 |
| | | | 335/192 |
| 2018/0114658 A1* | 4/2018 | Takahashi | H01H 50/305 |
| 2020/0126741 A1* | 4/2020 | Lee | H01H 33/182 |

FOREIGN PATENT DOCUMENTS

| | | |
|---|---|---|
| JP | H10223111 | 8/1998 |
| JP | 2009268548 | 11/2009 |
| JP | 4669267 | 4/2011 |

* cited by examiner

RELAY, BATTERY DISTRIBUTION BOX AND BATTERY PACK

CROSS-REFERENCE TO RELATED APPLICATION

This application claims the priority benefit of China application no. 202210263968.8, filed on Mar. 17, 2022. The entirety of the above-mentioned patent application is hereby incorporated by reference herein and made a part of this specification.

BACKGROUND

Technical Field

The disclosure relates to the technical field of batteries, in particular to a relay, a battery distribution box and a battery pack.

Description of Related Art

New energy vehicle high-voltage distribution box, referred to as BDU (battery disconnect unit), is a high-voltage current distribution unit in a solution for the high-voltage system of new energy vehicles. The high-voltage component is electrically connected through the copper bar and the wire harness to provide new energy vehicle with the following functions such as charge and discharge control, power-on control of high-voltage component, circuit overload and short-circuit protection, high-voltage sampling, and low-voltage control, so as to protect and monitor the operation of the high-voltage system. In the related art, the high-voltage distribution box includes multiple relays, and the total high-voltage output terminal inside a battery pack transmits a high-voltage signal to the inside of the relays through a conductive bar, and the conductive bar is tightly connected to the relays and the high-voltage output terminal through a bolt to realize high voltage transmission. The relays are mainly used for current carrying and switching in new energy battery system. However, when the relays are opened and closed, the noise is large, and the user experience is not good.

SUMMARY

The disclosure discloses a relay, a battery distribution box and a battery pack.

In a first aspect, the present disclosure provides a relay, which includes a relay body and a buffer assembly. The relay body includes a housing and a stationary contact, a movable contact and a coil assembly inside the housing. The coil assembly may drive the movable contact to move toward or away from the stationary contact, such that the movable contact is brought into contact with or disconnected from the stationary contact. The housing is fixed through a base, and the buffer assembly is arranged on the base, and/or mounted on an outside of the housing, and configured to buffer the force generated by an action of the movable contact.

In a second aspect, the present disclosure further provides a battery distribution box, including a frame and the relay described in the first aspect, and the relay is arranged on the frame. A buffer assembly in the relay is in contact with the frame.

In a third aspect, the present disclosure further provides a battery pack, including a box body and the relay described in the first aspect. The relay is arranged in the box body, and the buffer assembly is in contact with the box body.

In a fourth aspect, the present disclosure further provides a battery pack, including a box body and the battery distribution box described in the second aspect. The battery distribution box is arranged in the box body.

BRIEF DESCRIPTION OF THE DRAWINGS

For a better understanding of the disclosure, reference may be made to exemplary embodiments shown in the following drawings. The components in the drawings are not necessarily to scale and related elements may be omitted, or in some instances proportions may have been exaggerated, so as to emphasize and clearly illustrate the features described herein. In addition, related elements or components can be variously arranged, as known in the art. Further, in the drawings, like reference numerals designate same or like parts throughout the several views.

DESCRIPTION OF THE EMBODIMENTS

The technical solutions in the exemplary embodiments of the disclosure will be described clearly and explicitly in conjunction with the drawings in the exemplary embodiments of the disclosure. The description proposed herein is just the exemplary embodiments for the purpose of illustrations only, not intended to limit the scope of the disclosure, so it should be understood that and various modifications and variations could be made thereto without departing from the scope of the disclosure.

In the description of the present disclosure, unless otherwise specifically defined and limited, the terms "first", "second" and the like are only used for illustrative purposes and are not to be construed as expressing or implying a relative importance. The term "plurality" is two or more. The term "and/or" includes any and all combinations of one or more of the associated listed items.

In particular, a reference to "the" object or "a" and "an" object is intended to denote also one of a possible plurality of such objects. Unless otherwise defined or described, the terms "connect", "fix" should be broadly interpreted, for example, the term "connect" can be "fixedly connect", "detachably connect", "integrally connect", "electrically connect" or "signal connect". The term "connect" also can be "directly connect" or "indirectly connect via a medium". For the persons skilled in the art, the specific meanings of the abovementioned terms in the present disclosure can be understood according to the specific situation.

Further, in the description of the present disclosure, it should be understood that spatially relative terms, such as "above", "below" "inside", "outside" and the like, are described based on orientations illustrated in the figures, but are not intended to limit the exemplary embodiments of the present disclosure.

In the context, it should also be understood that when an element or features is provided "outside" or "inside" of another element(s), it can be directly provided "outside" or "inside" of the other element, or be indirectly provided "outside" or "inside" of the another element(s) by an intermediate element.

Figure 1:
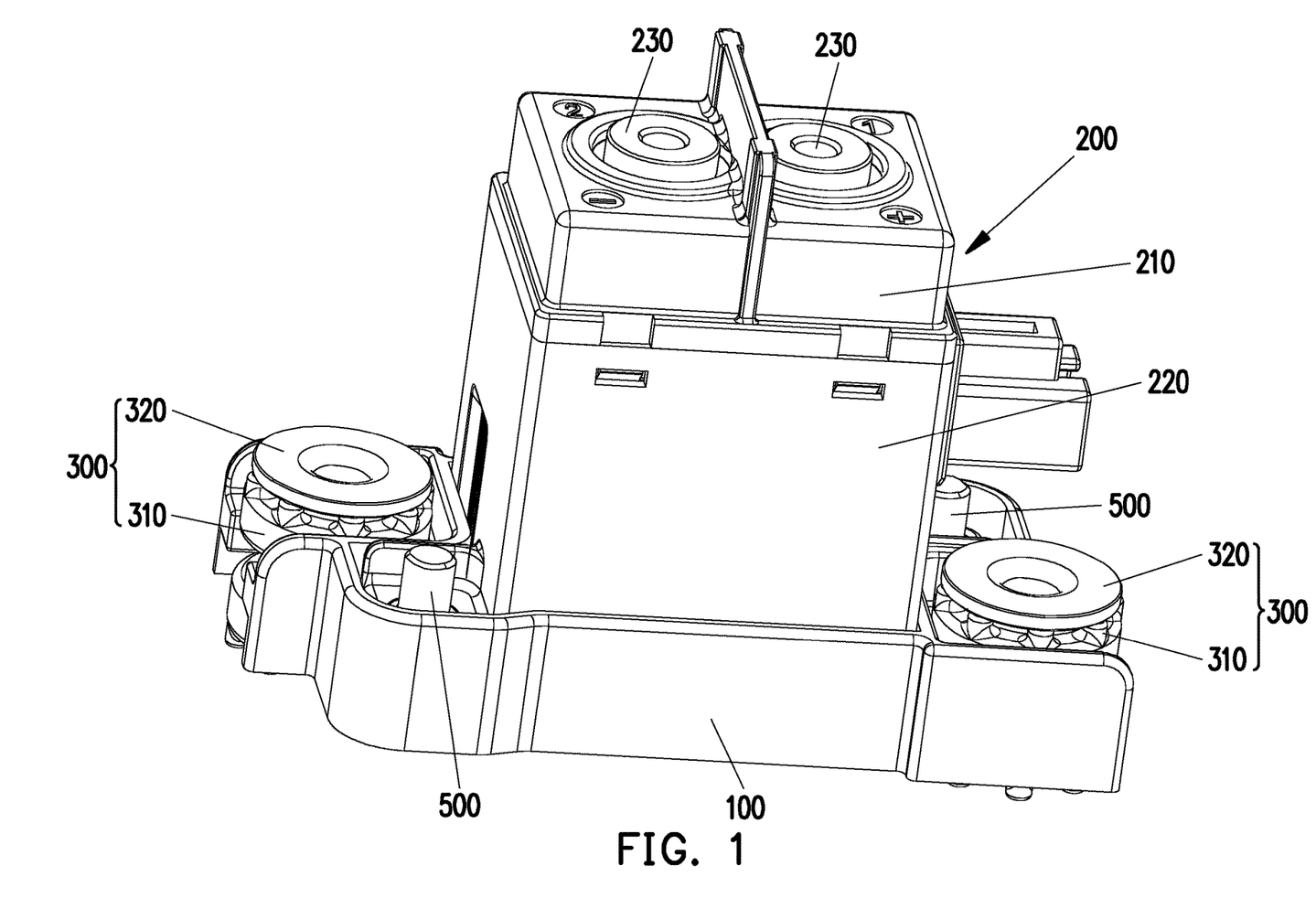
FIG. 1 is a three-dimensional perspective view of a relay according to an embodiment of the present disclosure.
Figure 2:
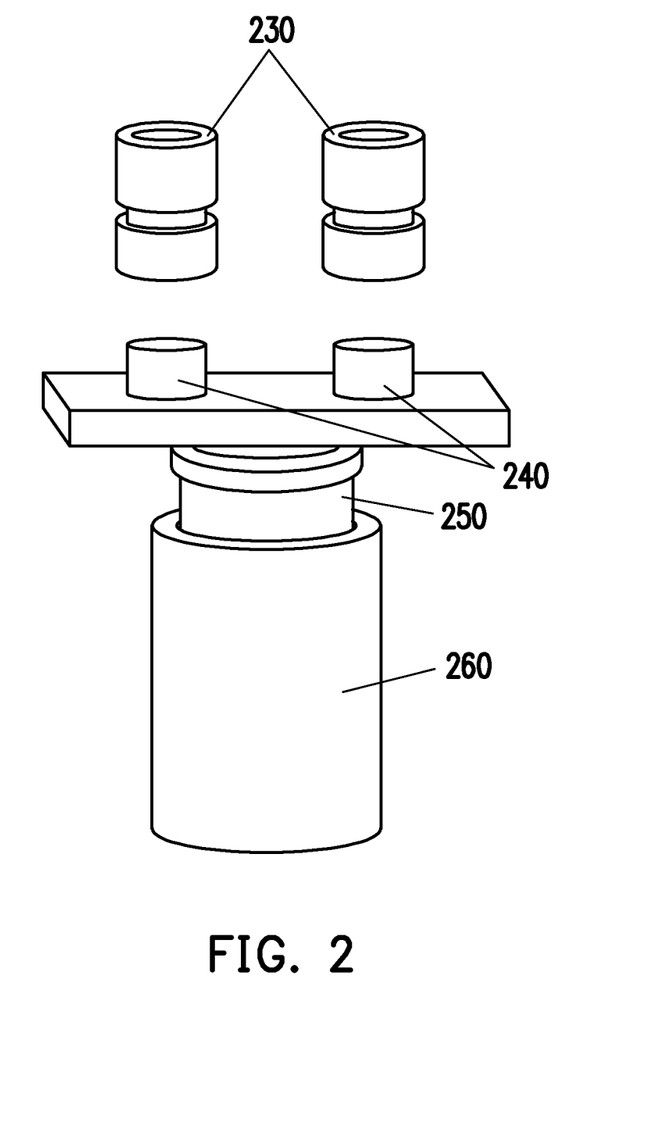
FIG. 2 is a schematic view of an internal structure of a relay body in a relay according to an embodiment of the present disclosure.

In the first aspect, as shown in FIG. 1 and FIG. 2, an embodiment of the present disclosure provides a relay, which includes a relay body 200 and a buffer assembly 300.

The relay body 200 includes a housing, a stationary contact 230, a movable contact 240 and a coil assembly located inside the housing. The coil assembly may drive the movable contact 240 to move toward or away from the stationary contact 230 to make the movable contact 240 to contact or disconnect from the stationary contact 230. For example, the housing includes an upper housing 210 and a lower housing 220, and the upper housing 210 and the lower housing 220 are engaged. The coil assembly includes an iron core 250 and a coil 260 for driving the movable contact 240 to move. The electromagnetic force generated by the iron core 250 and the coil 260 may drive the movable contact 240 to move, such that the movable contact 240 contacts or disconnects from the stationary contact 230, so as to realize the electromagnetic switching action. For example, after the coil 260 is energized, the iron core 250 is magnetized to generate a sufficient electromagnetic force, which attracts an armature and drives a reed, such that the movable contact 240 and the stationary contact 230 are closed or separated. That is, the originally closed contact is disconnected, and the originally disconnected contact is closed to realize the input and output of the overall current to the battery pack through the relay. When the relay is opened and closed, since the action of the movable contact 240 drives the relay to vibrate, the relay generates a loud noise.

The housing is fixed through the base 100. The buffer assembly 300 is arranged on the base 100 and/or outside the housing to buffer the force generated by the action of the movable contact 240. In the relay provided by the embodiment of the present disclosure, a buffer assembly 300 is provided on the base 100 or the outside of the housing of the relay body 200, and the buffer assembly 300 is located at the connection between the relay and other devices such as a power distribution box or a battery pack, which serves a buffering function and reduces the vibration of the relay, and the structural design of the relay body 200 does not need to be changed. Therefore, the relay provided by the embodiment of the present disclosure adopts a simple structure, and the noise may be reduced at a low cost.

In some embodiments, the buffer assembly 300 includes a buffer member 310. It can be understood that the function of the buffer member is to provide a buffer function for the relay, therefore, any structure that can achieve the above functions may be used as the buffer member in this embodiment. For example, the buffer is an elastic pad, which is adhered to the base and is located on a surface of the base in contact with other electrical devices. Alternatively, the elastic pad is adhered to the housing of the relay body and is located on an outer surface of the housing in contact with other electrical devices. Alternatively, the buffer member is in a shape or structure that can function as a buffer. The buffer member 310 buffers and attenuates the vibration of the relay, reduces the noise of the relay, and improves the user experience.

In some embodiments, the buffer member 310 is made of elastic material, such as rubber, etc., but is not limited thereto.

In some embodiments, the base 100 is provided with a fixing hole 101 penetrating the base 100. The buffer member 310 is a cylindrical structure, and the buffer member 310 is arranged in the fixing hole 101.

In a possible implementation, the cylindrical buffer member 310 is arranged in the fixing hole 101 of the base 100, and the axis of the buffer member 310 is parallel to the axis of the fixing hole 101. The base 100 is connected and fixed with other electrical devices through the fixing hole 101, and the buffer member 310 may buffer and attenuate the vibration of the base 100, thereby reducing the noise generated by the vibration of the relay. Exemplarily, the buffer member 310 is engaged in the fixing hole 101, for example, the buffer member 310 is in an interference fit with the base 100, or the buffer member 310 is engaged with the base 100 through a snap.

In some embodiments, the buffer member 310 at least partially protrudes from the first surface, and the first surface is a surface on one side of the base 100 facing away from the relay body 200.

Figure 3:
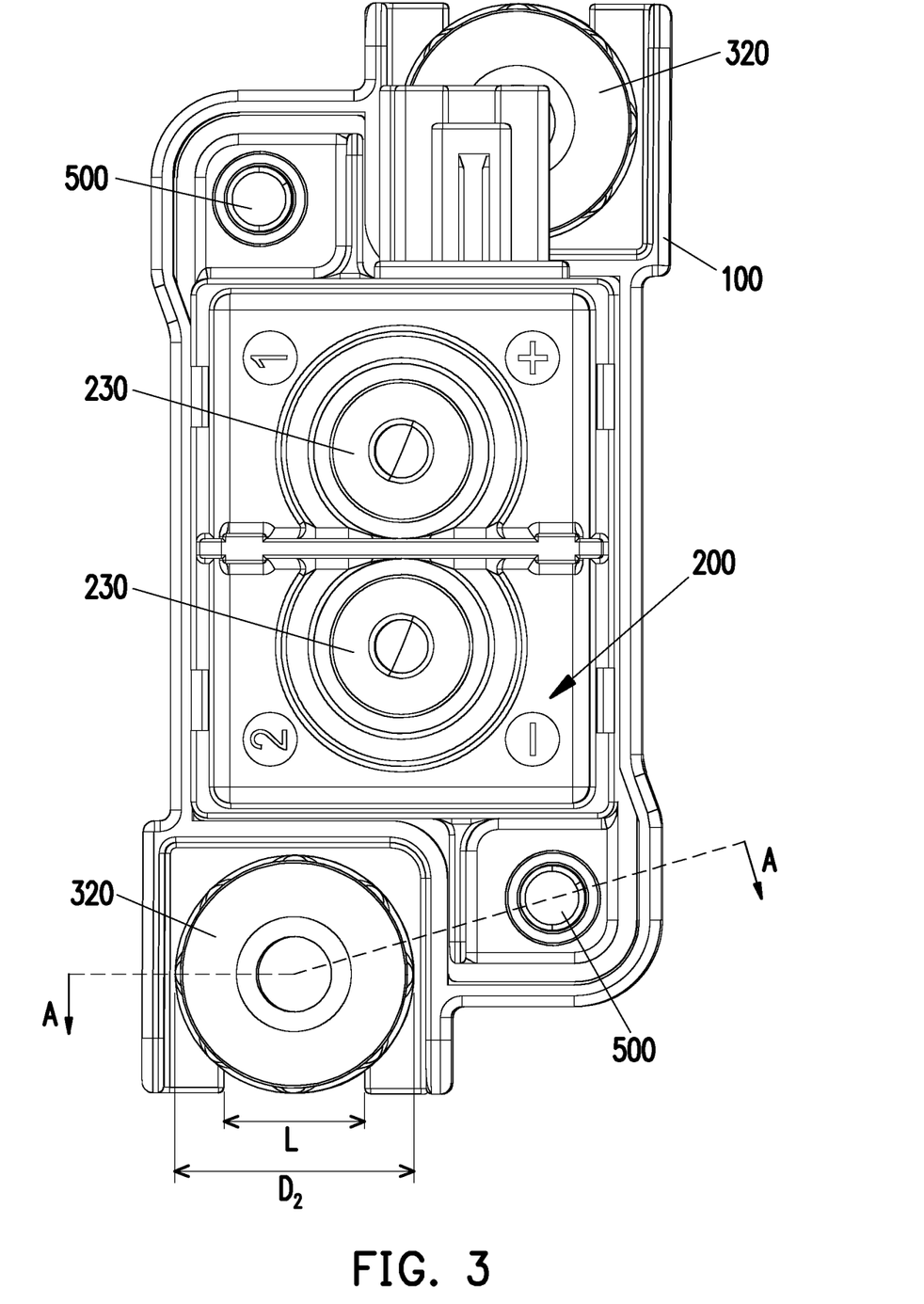
FIG. 3 is a top view of a relay according to an embodiment of the present disclosure.
Figure 4:
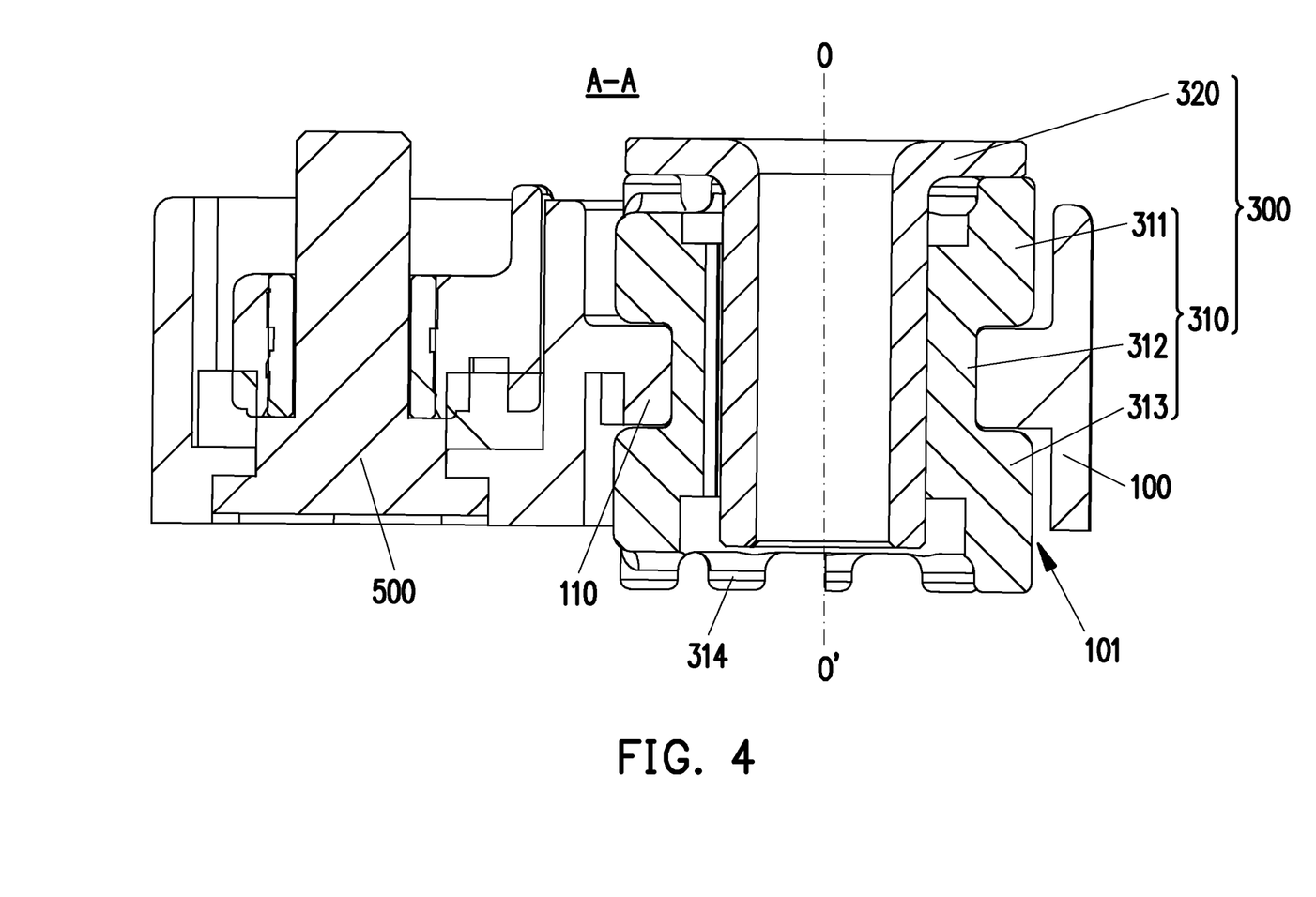
FIG. 4 is a sectional view taken along line A-A in FIG. 3.

In the relay, referring to FIG. 3 and FIG. 4, FIG. 4 is a sectional view of FIG. 3, the sectional line includes a section AO and a section OA with an obtuse angle, and a point O is located on the axis of the fixing hole 101 and the buffer member 310. The fixing hole 101 coincides with the axis of the buffer member 310. The base 100 includes a first surface and a second surface opposite to each other, the first surface of the base 100 is used for contacting other devices, and the relay body 200 is arranged on the second surface of the base 100. The base 100 is provided with the fixing hole 101, the buffer member 310 is arranged in the fixing hole 101, and the buffer member 310 at least partially protrudes from the first surface. That is, when the base 100 is in contact with other devices, the part of the buffer member 310 protruding from the first surface of the base 100 is in direct contact with the surfaces of other devices and may serve a buffering function. In the relay provided by an embodiment of the present disclosure, the buffer assembly 300 is provided on the base 100, and the buffer assembly 300 is located at the connection between the base 100 and other devices, such as a power distribution box or a battery pack, to serve a buffering function, reduce the vibration of the relay, and the structural design of the relay body 200 does not need to be changed. Therefore, the relay provided by the embodiment of the present disclosure adopts a simple structure, and the noise may be reduced at a low cost.

Figure 5:
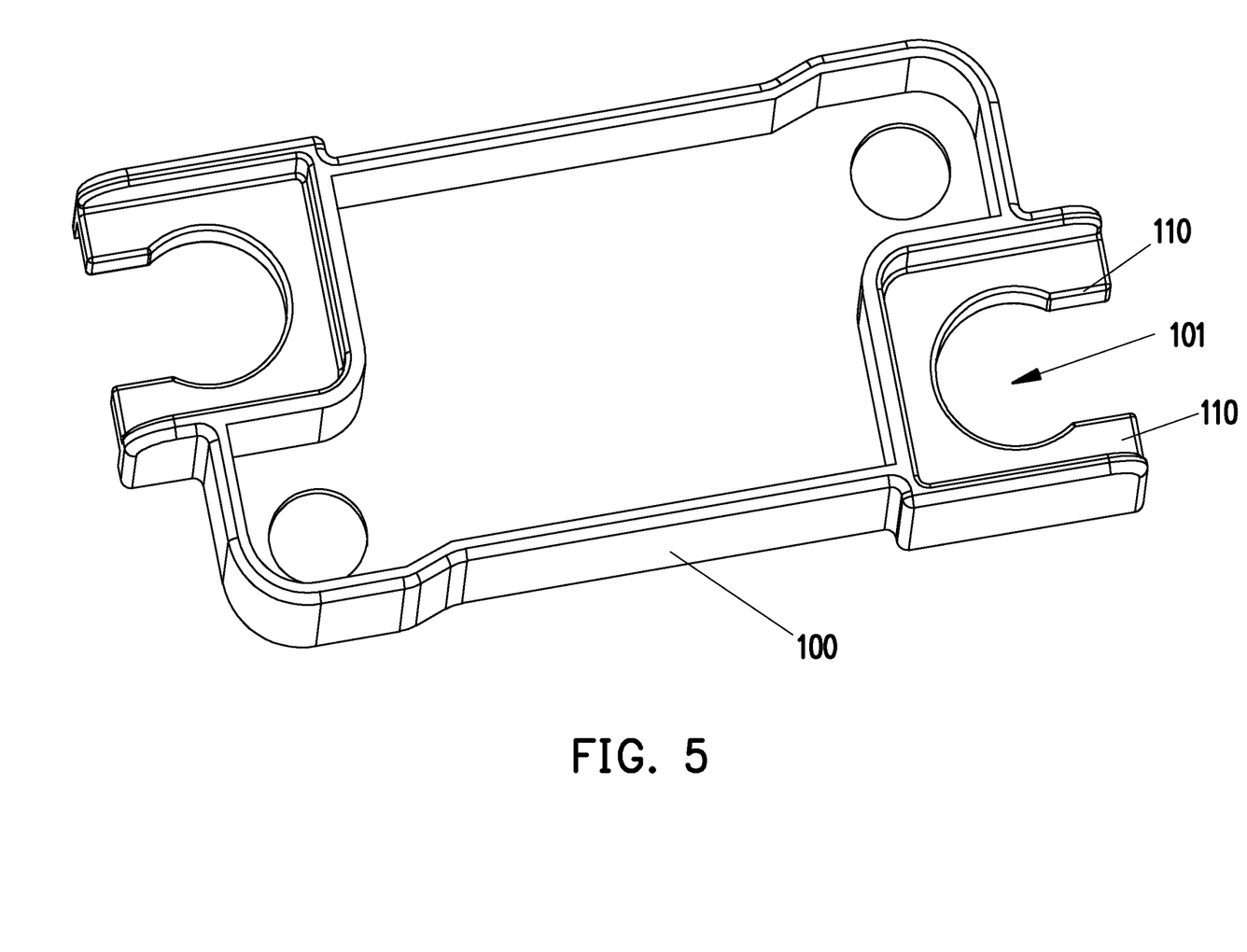
FIG. 5 is a schematic structural view of a base in a relay according to an embodiment of the present disclosure.

In a possible implementation, there is a notch on the side wall of the fixing hole 101, as shown in FIG. 3. The notch has a width L, the diameter of the buffer member 310 is $D_2$, and $L<D_2$. Exemplarily, the buffer member 310 may be inserted into the fixing hole 101 from the notch on the side wall of the fixing hole 101. Since the width L of the notch is smaller than the diameter $D_2$ of the buffer member 310, it is possible to prevent the buffer member 310 from sliding out of the notch. Continuing to refer to FIG. 4 in conjunction with FIG. 5, an engaging portion 110 is provided on the side wall of the fixing hole 101. The engaging portion 110 extends along the circumferential direction of the fixing hole 101, and the buffer member 310 is provided with a slot that cooperates with the engaging portion 110 to prevent the buffer member 310 from shifting. A support member 320 is used to provide rigid support for the buffer member 310.

In some embodiments, referring to FIG. 4, along the direction of an axis OO' of the buffer member 310, the buffer member 310 includes a first end portion 311, a connecting segment 312 and a second end portion 313. Exemplarily, the axis OO' of the buffer member 310 is perpendicular to the first surface of the base 100. A plurality of protrusions 314 are provided on one side of the first end portion 311 facing away from the connecting segment 312, and the plurality of protrusions 314 are distributed at intervals around the axis of the buffer member 310. And/or, a plurality of protrusions 314 are provided on one side of the second end portion 313 facing away from the connecting segment 312, and the plurality of protrusions 314 are distributed at intervals around the axis of the buffer member 310.

It should be noted that, "a plurality" can be understood as two or more. Here, "and/or" includes three solutions as follow. A plurality of protrusions 314 are provided on one side of the first end portion 311 facing away from the connecting segment 312, the plurality of protrusions 314 are distributed at intervals around the axis of the buffer member 310, and the second end portion 313 is not provided with protrusions. Alternatively, the first end portion 311 is not provided with protrusions, and a plurality of protrusions 314 are provided on one side of the second end portion 313 facing away from the connecting segment 312, and the plurality of protrusions 314 are distributed at intervals around the axis of the buffer member 310. Alternatively, the plurality of protrusions 314 are provided on one side of the first end portion 311 facing away from the connecting segment 312, the plurality of protrusions 314 are distributed at intervals around the axis of the buffer member 310, the plurality of protrusions 314 are provided on one side of the second end portion 313 facing away from the connecting segment 312, and the plurality of protrusions 314 are distributed at intervals around the axis of the buffer member 310.

Figure 6A:
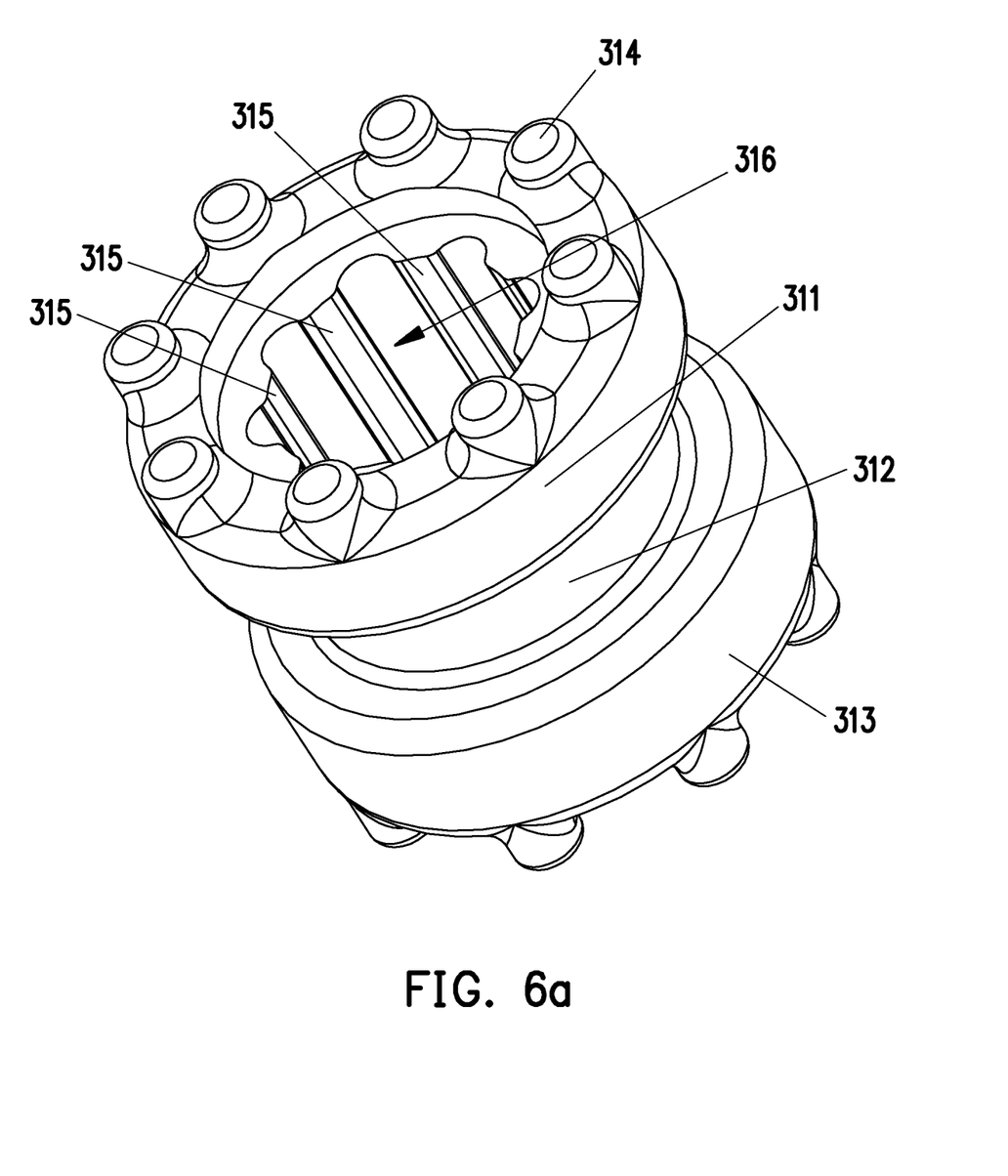
FIG. 6a and FIG. 6b are schematic structural views of a buffer member in a relay according to an embodiment of the present disclosure.
Figure 6B:
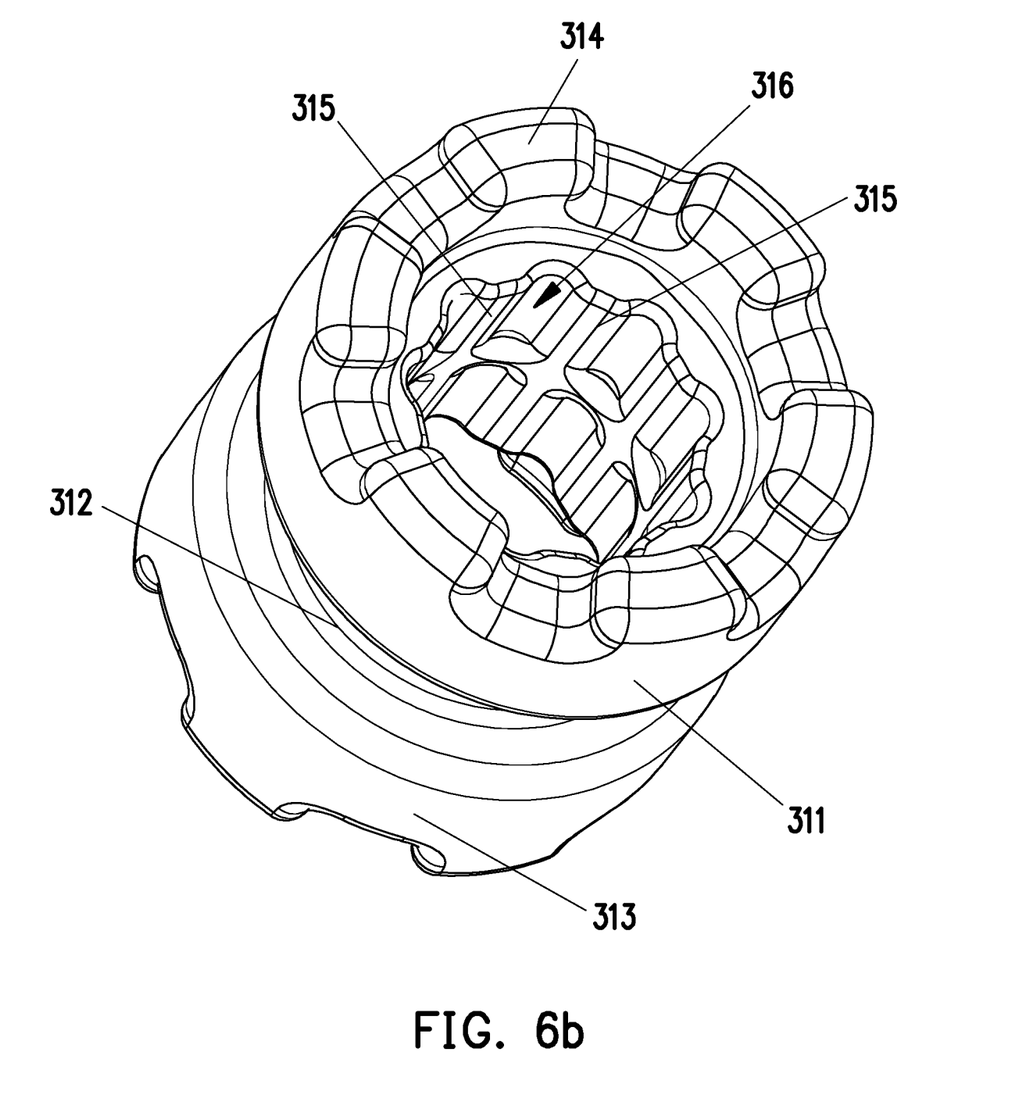

In a possible implementation, referring to FIG. 6a and FIG. 6b, the buffer member 310 is substantially a cylindrical structure, and the buffer member 310 is engaged with the fixing hole 101. The buffer member 310 includes a first end portion 311, a connecting segment 312 and a second end portion 313. The outer diameter of the connecting segment 312 is smaller than the outer diameter of the first end portion 311, and the outer diameter of the connecting segment 312 is smaller than the outer diameter of the second end portion 313. Therefore, the first end portion 311, the connecting segment 312 and the second end portion 313 form a concave slot to be engaged with the engaging portion 110 on the side wall of the fixing hole 101. A plurality of protrusions 314 are provided on one side of the first end portion 311 facing away from the connecting segment 312. For example, there are eight protrusions 314 in FIG. 6a, there are six protrusions 314 in FIG. 6b, the plurality of protrusions 314 are annularly distributed along the circumference of the first end portion 311, and the support member 320 is in direct contact with the protrusions 314. Further referring to FIG. 6a and FIG. 6b, a plurality of protrusions 314 are provided on one side of the second end portion 313 facing away from the connecting segment 312, the plurality of protrusions 314 are annularly distributed along the circumference of the second end portion 313, and the protrusions 314 on the second end portion 313 are in direct contact with other devices. It should be noted that, the buffer member 310 achieves the buffering effect through the deformation of the protrusions 314, rather than through the contact between the entire end surface of the buffer member 310 with other devices. In this manner, it is possible to prevent the risk of cracking of the end surface of the buffer member 310, thereby achieving the effect of increasing the service life.

In some embodiments, the buffer assembly 300 further includes a support member 320. The buffer member 310 is internally provided with a sleeve hole for coupling with the support member 320, and the axis of the sleeve hole is parallel to the axis of the buffer member 310.

In a possible implementation, continuing to refer to FIG. 3 and FIG. 4, the support member 320 is inserted into the sleeve hole inside the buffer member 310, and the support member 320 may provide support and guidance for the buffer member 310. Exemplarily, the support member 320 is in an interference fit with the buffer member 310.

In some embodiments, a plurality of protruding strips 315 are arranged along the axial direction of the sleeve hole on the side wall of the sleeve hole, and the extending direction of the protruding strips 315 is parallel to the axial direction of the buffer member 310.

In a possible implementation, further referring to FIG. 6a and FIG. 6b, the buffer member 310 has a sleeve hole matched with the support member 320, a plurality of protruding strips 315 are arranged along the circumference of the buffer member 310 on the inner wall of the buffer member 310, and the plurality of protruding strips 315 are arranged at intervals. An avoiding slot is formed between two adjacent protruding strips 315, that is, the slot wall of the avoiding slot is the protruding strips 315 on both sides. The opening of the avoiding slot faces the axis of the buffer member 310. Exemplarily, the cross section of the avoiding slot is U-shaped or V-shaped. The protruding strips 315 on the buffer member 310 may relieve the frictional force when the buffer member 310 is assembled with the support member 320. When the support member 320 is inserted into the sleeve hole, the support member 320 contacts the protruding strip 315, and the support member 320 does not contact the part corresponding to the avoiding slot, thereby reducing the frictional force. In the meantime, the protruding strips 315 may increase the rigidity of the buffer member 310 to a certain extent, and the surface on one side of the protruding strips 315 facing the center of the support hole is in direct contact with the support member 320. When the buffer member 310 is squeezed, the structures of the slot and the protruding strips 315 of the buffer member 310 are deformed, that is, through structural deformation, the buffer member 310 may effectively prevent the risk of cracking of the buffer member 310 caused by deformation, so as to increase the service life.

In some embodiments, the support member 320 includes a cover plate portion 321 and a guide portion 322. The guide portion 322 is sleeved with the buffer member 310, and the cover plate portion 321 is in contact with the first end portion 311. The support member 320 has a connection hole penetrating through the cover plate portion 321 and the guide portion 322, and the axial direction of the connection hole is parallel to the axial direction of the sleeve hole. Exemplarily, the axial direction of the connection hole coincides with the axial direction of the sleeve hole.

Figure 7:
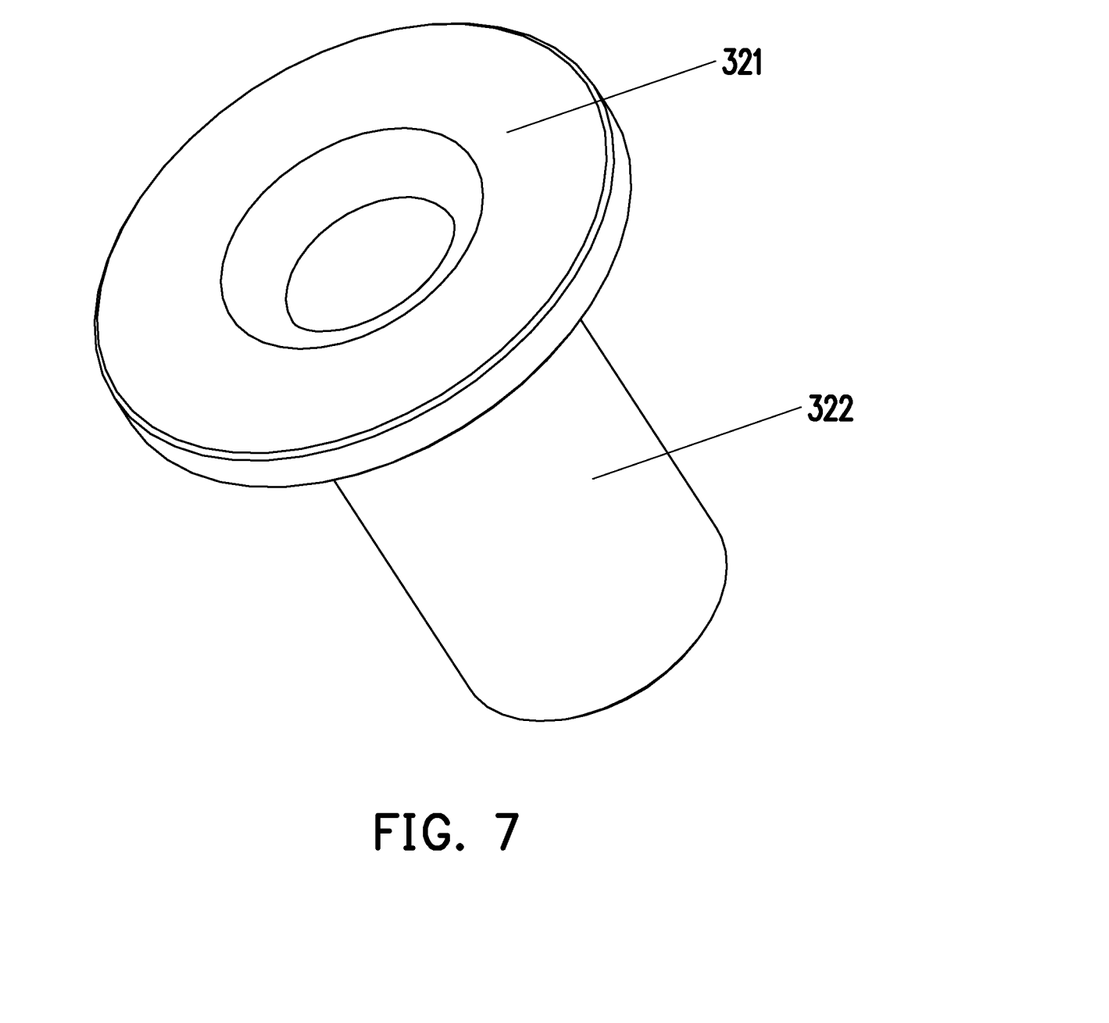
FIG. 7 is a schematic structural view of a support member in a relay according to an embodiment of the present disclosure.

In a possible implementation, referring to FIG. 7, the support member 320 includes a cover plate portion 321 and a guide portion 322, and the cover plate portion 321 and the guide portion 322 form a T-shaped structure. Referring to FIG. 4, FIG. 6a and FIG. 6b, the guide portion 322 is inserted into the sleeve hole in the buffer member 310 and is in direct contact with the protruding strip 315 of the buffer member 310. The size of the cover plate portion 321 is larger than the size of the sleeve hole. When the guide portion 322 is inserted into the sleeve hole, the cover plate portion 321 remains outside the sleeve hole, and a surface in the cover plate portion 321 facing one side of the first surface of the base 100 is in direct contact with the protrusions 314 on the buffer member 310. The support member 320 may provide a supporting force for the buffer member 310 while preventing the buffer member 310 from deforming too much, thus protecting the buffer member 310. In addition, the support member 320 has a connection hole therein for matching with the connection member. The connection member penetrates through the connection hole to realize the connection between the relay and other devices.

In some embodiments, the support member 320 includes a steel sleeve, and the support strength is relatively high. The support member 320 may also include a copper sleeve, an aluminum sleeve, etc., but is not limited thereto.

In some embodiments, the base 100 has a configuration area for configuring the relay body 200, and the fixing hole 101 is located outside the configuration area.

In a possible implementation, continuing to refer to FIG. 4, the relay body 200 is arranged in the middle area of the base 100, and the fixing hole 101 is provided in the area of the base 100 near the edge. In this way, neither the configuration of the relay body 200 nor the fixation of the base 100 is affected.

In some embodiments, there are a plurality of fixing holes 101, and the plurality of fixing holes 101 are distributed at intervals around the configuration area. A buffer assembly 300 is arranged in at least one fixing hole 101.

It should be noted that when the buffer assembly 300 is arranged in at least one fixing hole 101, it can be understood that some of the fixing holes 101 are provided with the buffer assembly 300, and some of the fixing holes 101 are not provided with the buffer assembly 300, and the number of the fixing holes provided with the buffer assembly 300 is greater than 1; or, all of the fixing holes 101 are provided with the buffer assembly 300.

In a possible implementation, continuing to refer to FIG. 1 and FIG. 3, there are two fixing holes 101 on the base 100, and each of the fixing holes 101 is provided with a buffer assembly 300. In addition, the base 100 may be approximately regarded as a rectangle, and the two fixing holes 101 are arranged along the diagonal of the rectangle.

In order to further reduce noise, in some embodiments, a sound absorbing element 400 is disposed between the relay body 200 and the base 100 to reduce the noise between the relay body 200 and the base 100.

In some embodiments, the sound absorbing element 400 includes at least one of sound dampening cotton or sound absorbing cotton or sound insulating cotton.

Figure 8A:
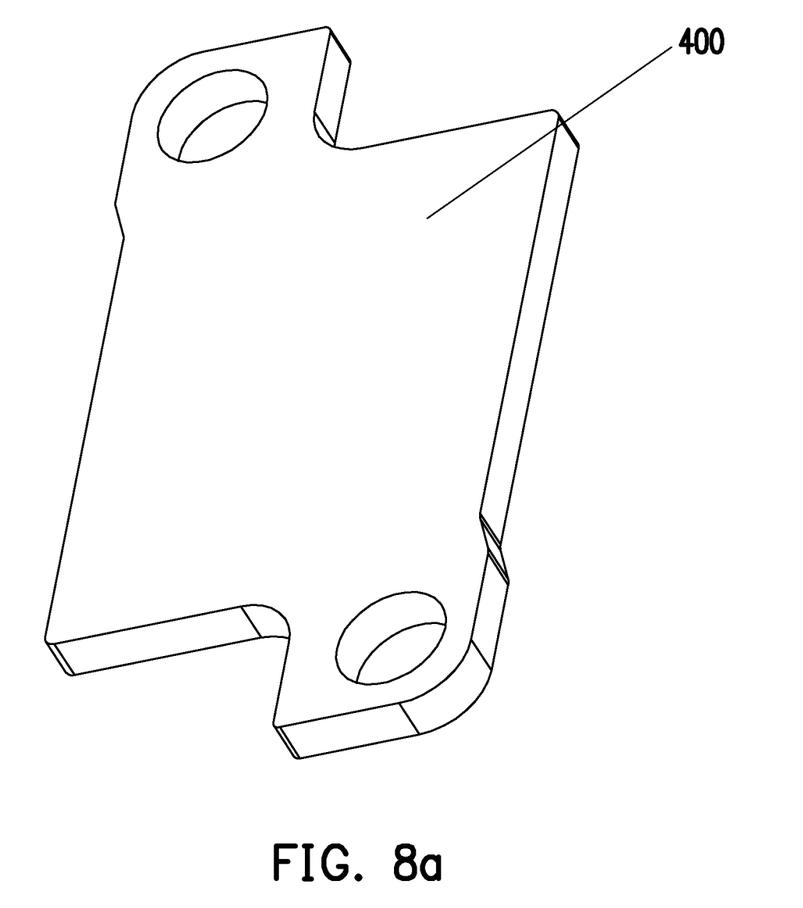
FIG. 8a and FIG. 8b are schematic structural views of a sound absorbing element in a relay according to an embodiment of the present disclosure.
Figure 8B:
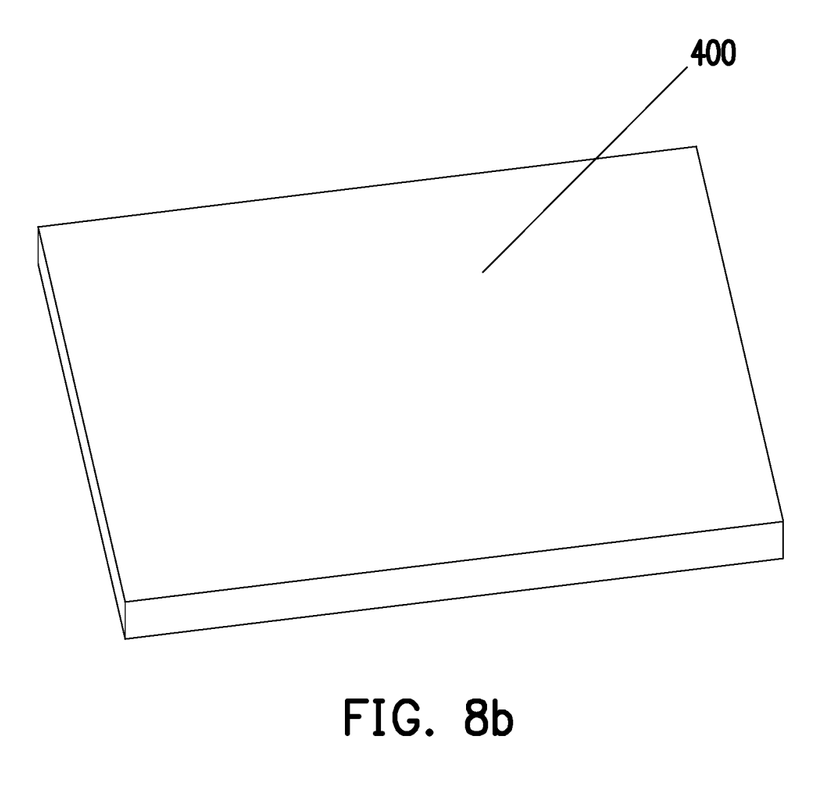

It should be noted that, the sound absorbing cotton is a roll-like/sheet-like material processed from a single or multiple different fibers through various processes. Two-component sound absorbing cotton is commonly adopted, and polyester sound absorbing cotton is one of them. As shown in FIG. 8a and FIG. 8b, the sound absorbing cotton adopted in this embodiment is a sheet-like structure.

The sound absorbing cotton is a man-made inorganic fiber, which uses quartz sand, limestone, dolomite and other natural ores as the main raw materials, and is combined with some soda ash, borax and other chemical raw materials to be melted into glass. The sound absorbing cotton has high sound absorption rate and good performance in sound insulation.

The sound insulation cotton is a fiber porous sound insulation material, such as polyester fiber cotton sound insulation cotton, centrifugal glass wool, rock wool, mineral wool, plant fiber coating, etc. The sound insulation mechanism of sound insulation cotton is that there are a large number of tiny connected pores inside the material, and sound waves can pass through along these pores to enter the material. The friction between the sound waves and the material converts the sound energy into heat energy. The sound insulation characteristic of porous sound insulation materials is that the sound insulation coefficient gradually increases with the increase of frequency, which means that the low frequency absorption is not as good as the high frequency absorption. For example, the vibration of objects generates sound, the sound waves are transmitted in the air, and the sound insulation cotton has a multi-fiber structure. When the sound waves pass through the cotton, they are reflected, superimposed, and collided through countless fibers. In this way, the sound wave energy is converted into heat energy, the intensity of sound wave is weakened, and the sound disappears.

In some embodiments, the relay further includes a first connector 500, and the first connector 500 penetrates through the base 100, the sound absorbing element 400 and the relay body 200 in sequence.

In a possible implementation, referring to FIG. 1, FIG. 3 and FIG. 4 in combination with FIG. 8a, the base 100 and the relay body 200 are connected through the first connector 500. The sound absorbing element 400 is located between the base 100 and the relay body 200. In order to fix the sound absorbing element 400 as well, the first connector 500 penetrates through the base 100, the sound absorbing element 400 and the relay body 200 in sequence. For example, the first connector 500 is a threaded pillar.

In a second aspect, an embodiment of the present disclosure further provides a battery power distribution box, including a frame and the relay described in any one of the embodiments of the first aspect, and the relay is arranged on the frame. The buffer assembly 300 in the relay is in contact with the frame.

In a possible implementation, the relay is arranged on the frame through a second connector, for example, the second connector penetrates through the connection hole of the support member 320, so that the relay and the frame are fixed relative to each other.

In a third aspect, an embodiment of the present disclosure further provides a battery pack, including a box body and the relay described in any one of the embodiments of the first aspect. The relay is arranged in the box body, and the buffer assembly 300 is in contact with the box body.

In a possible implementation, the relay is arranged on the box body through a third connector, for example, the third connector penetrates through the connection hole of the support member 320, so that the relay and the box body are fixed relative to each other.

In a fourth aspect, an embodiment of the present disclosure further provides a battery pack, including a box body and the relay described in any one of the embodiments of the first aspect. The battery distribution box is arranged in the box body.

In a possible implementation, the relay is arranged in the battery distribution box, and the battery distribution box is arranged in the box body. The relay is arranged on the frame through the second connector. For example, the second connector penetrates through the connection hole of the support member 320, so that the relay and the frame are fixed relative to each other.

Therefore, in the relay provided by the embodiment of the present disclosure, the generated noise may be reduced by arranging the buffer assembly 300 on the base 100, and the sound absorbing element 400 is arranged at the bottom of the relay body 200, that is, between the relay body 200 and the base 100 to absorb the noise, so as to reduce the noise generated by the relay and improve the user experience.

Other embodiments of the disclosure will be apparent to those skilled in the art from consideration of the specification and practice of the disclosure disclosed herein. The disclosure is intended to cover any variations, uses or adaptations of the disclosure. These variations, uses, or adaptations follow the general principles of the disclosure and include common general knowledge or conventional technical means in the art that are not disclosed in the present disclosure. The specification and embodiments are illustrative, and the real scope and spirit of the present disclosure is defined by the appended claims.

It should be understood that the disclosure is not limited to the precise structures that have been described above and shown in the drawings, and various modifications and variations can be made without departing from the scope thereof. The scope of the disclosure is limited only by the appended claims.

What is claimed is:

1. A relay, comprising: a relay body and a buffer assembly;
   wherein the relay body comprises a housing and a stationary contact, a movable contact and a coil assembly inside the housing, the coil assembly is able to drive the movable contact to move toward or away from the stationary contact, such that the movable contact is brought into contact with or disconnected from the stationary contact;
   the housing is fixed through a base, and the buffer assembly is arranged on the base, and/or mounted on an outside of the housing, and configured to buffer a force generated by an action of the movable contact,
   wherein the relay further comprises a first connector, and the first connector is configured to connect the relay body onto the base, and the first connector is arranged to be spaced apart from the buffer assembly.

2. The relay according to claim 1, wherein the buffer assembly comprises a buffer member;
   the base is provided with a fixing hole penetrating the base, the buffer member is a cylindrical structure, and the buffer member is arranged in the fixing hole.

3. The relay according to claim 2, wherein the buffer member at least partially protrudes from a first surface, and the first surface is a surface on one side of the base facing away from the relay body.

4. The relay according to claim 3, wherein the base has a configuration area for configuring the relay body, and the fixing hole is located outside the configuration area.

5. The relay according to claim 2, wherein along an axial direction of the buffer member, the buffer member comprises a first end portion, a connecting segment and a second end portion;
   a plurality of protrusions are provided on one side of the first end portion facing away from the connecting segment, and the plurality of protrusions are distributed at intervals around an axis of the buffer member; and/or,
   the plurality of protrusions are provided on one side of the second end portion facing away from the connecting segment, and the plurality of protrusions are distributed at intervals around the axis of the buffer member.

6. The relay according to claim 5, wherein the buffer assembly further comprises a support member, the buffer member is internally provided with a sleeve hole for coupling with the support member, and an axis of the sleeve hole is parallel to the axis of the buffer member.

7. The relay according to claim 6, wherein a plurality of protruding strips are arranged along an axial direction of the sleeve hole on a side wall of the sleeve hole, and an extending direction of the protruding strips is parallel to the axial direction of the buffer member.

8. The relay according to claim 7, wherein the base has a configuration area for configuring the relay body, and the fixing hole is located outside the configuration area.

9. The relay according to claim 6, wherein the support member comprises a cover plate portion and a guide portion, the guide portion is sleeved with the buffer member, and the cover plate portion is in contact with the first end portion;
   the support member has a connection hole penetrating through the cover plate portion and the guide portion, and an axial direction of the connection hole is parallel to an axial direction of the sleeve hole.

10. The relay according to claim 6, wherein the base has a configuration area for configuring the relay body, and the fixing hole is located outside the configuration area.

11. The relay according to claim 5, wherein the base has a configuration area for configuring the relay body, and the fixing hole is located outside the configuration area.

12. The relay according to claim 2, wherein the base has a configuration area for configuring the relay body, and the fixing hole is located outside the configuration area.

13. The relay according to claim 12, wherein the fixing hole is in plurality, and the plurality of the fixing holes are distributed at intervals around the configuration area; and
   at least one of the fixing holes is provided with the buffer assembly.

14. The relay according to claim 13, wherein the buffer assembly corresponds to the fixing holes one by one.

15. The relay according to claim 1, wherein a sound absorbing element is arranged between the relay body and the base.

16. The relay according to claim 15, wherein the sound absorbing element comprises at least one of a sound dampening cotton or a sound absorbing cotton or a sound insulating cotton.

17. The relay according to claim 16, wherein the first connector penetrates through the base, the sound absorbing element and the relay body in sequence.

18. A battery power distribution box, comprising a frame and the relay as claimed in claim 1, wherein the relay is arranged on the frame;
   wherein the buffer assembly in the relay is in contact with the frame.

19. A battery pack, comprising a box body and the battery power distribution box as claimed in claim 18;
   wherein the battery distribution box is arranged in the box body.

20. A battery pack, comprising a box body and the relay as claimed in claim 1;
   wherein the relay is arranged in the box body, and the buffer assembly is in contact with the box body.

* * * * *